United States Patent
Chen et al.

(10) Patent No.: US 11,958,938 B2
(45) Date of Patent: Apr. 16, 2024

(54) CURABLE COMPOSITION

(71) Applicant: 3M INNOVATIVE PROPERTIES COMPANY, St. Paul, MN (US)

(72) Inventors: Lianzhou Chen, Woodbury, MN (US); Sohaib Elgimiabi, Dusseldorf (DE); Dmitriy Salnikov, Woodbury, MN (US); Jay S. Schlechte, Oakdale, MN (US); Yaoyao Chen, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/918,188

(22) PCT Filed: Apr. 9, 2021

(86) PCT No.: PCT/IB2021/052959
§ 371 (c)(1),
(2) Date: Oct. 11, 2022

(87) PCT Pub. No.: WO2021/220090
PCT Pub. Date: Nov. 4, 2021

(65) Prior Publication Data
US 2023/0132320 A1    Apr. 27, 2023

Related U.S. Application Data

(60) Provisional application No. 63/016,421, filed on Apr. 28, 2020.

(51) Int. Cl.
| | |
|---|---|
| C08G 59/50 | (2006.01) |
| C08G 59/18 | (2006.01) |
| C08G 59/32 | (2006.01) |
| C08G 59/42 | (2006.01) |
| C08L 63/00 | (2006.01) |
| C09J 163/00 | (2006.01) |

(52) U.S. Cl.
CPC ....... C08G 59/184 (2013.01); C08G 59/3227 (2013.01); C08G 59/4253 (2013.01); C08G 59/504 (2013.01); C09J 163/00 (2013.01); C09J 2433/00 (2013.01)

(58) Field of Classification Search
CPC ............. C08G 59/50; C08G 59/5006; C08G 59/5013; C08G 59/502; C08G 59/5026; C09J 163/00; C08L 63/00

USPC .......... 523/428, 440, 443, 461, 466
See application file for complete search history.

(56) References Cited

U.S. PATENT DOCUMENTS

| | | | |
|---|---|---|---|
| 3,018,262 A | 1/1962 | Schroeder et al. | |
| 3,298,998 A | 1/1967 | McConnell et al. | |
| 4,518,749 A | 5/1985 | Waddill et al. | |
| 4,778,851 A | 10/1988 | Henton et al. | |
| 4,800,222 A | 1/1989 | Waddill | |
| 5,332,781 A * | 7/1994 | Eldin | C08L 63/00 525/530 |
| 6,773,754 B2 | 8/2004 | Whiter | |
| 10,329,464 B2 | 6/2019 | Chen et al. | |
| 2003/0144416 A1* | 7/2003 | Tarbutton | C08G 59/182 525/65 |
| 2009/0298969 A1 | 12/2009 | Attarwala et al. | |
| 2011/0224331 A1* | 9/2011 | Ross | C08L 63/00 523/447 |
| 2011/0313082 A1* | 12/2011 | Popp | C09J 163/00 156/330 |
| 2013/0115442 A1 | 5/2013 | Sang et al. | |
| 2015/0252183 A1 | 9/2015 | Xie et al. | |

FOREIGN PATENT DOCUMENTS

| | | |
|---|---|---|
| EP | 2468792 A1 | 6/2012 |
| EP | 3275913 B1 | 11/2021 |
| JP | 2015108077 A | 6/2015 |
| WO | 2012007963 A2 | 1/2012 |
| WO | 2012064717 A2 | 5/2012 |
| WO | 2012064724 A2 | 5/2012 |

OTHER PUBLICATIONS

International Search Report for PCT Application No. PCT/IB2021/052959 dated Jul. 19, 2021, 4 pages.
Lee, "Handbook of Epoxy Resins", (1967).

* cited by examiner

*Primary Examiner* — Michael J Feely
(74) *Attorney, Agent, or Firm* — Philip P. Soo

(57) ABSTRACT

Provided is a curative part usable in a two-part curable composition. The curative part includes a liquid amine; a heterogeneous dispersant; and core-shell rubber particles having an elastomeric core and a (meth)acrylic shell. The core-shell rubber particles and the heterogeneous dispersant can be collectively shear-dispersed in the liquid amine such that the core-shell rubber particles are substantially non-aggregated and the curative part is phase-stable over a period of at least 3 months at ambient temperature. Advantageously, large amounts of core-shell rubber particles can thus be incorporated into a cured resin matrix, which can afford significantly enhanced impact performance.

11 Claims, No Drawings

CURABLE COMPOSITION

CROSS REFERENCE TO RELATED APPLICATIONS

This application is a national stage filing under 35 U.S.C. 371 of PCT/IB2021/052959, filed Apr. 9, 2021, which claims the benefit of U.S. Provisional Patent Application No. 63/016,421, filed Apr. 28, 2020, the disclosure of which is incorporated by reference in its/their entirety herein.

FIELD OF THE INVENTION

Provided are two-part curable compositions. More particularly, provided are two-part curable compositions that can be cured to form structural adhesives useful for industrial bonding applications.

BACKGROUND

In large-scale manufacturing processes, adhesives are making their way into many fastening applications that traditionally use mechanical fixtures such as screws, rivets, and welds. Adhesives enjoy certain characteristic advantages over their mechanical counterparts—for example, adhesives can evenly distribute stress on the bonded parts, avoid galvanic corrosion, and even provide improved shock and vibration damping properties. These benefits are of particular value in bonding applications in the automotive and aerospace industries.

Adhesives used to bond structural elements are commonly referred to as structural adhesives. These adhesives are relied upon to provide structural integrity of the bonded assembly, where bond reliability is of great importance. Not only do these materials need to display sufficient adhesive strength, but they must retain these properties over a wide range of operating temperatures, environments, and stress conditions.

Optimizing the properties of a structural adhesive for a given application can be a significant engineering challenge. For instance, some thermosetting resin compositions, such as thermosetting epoxy compositions, can exhibit high strength at high service temperatures but are vulnerable to brittle fracture when subjected to impact conditions or cold temperatures. Reducing brittleness in an epoxy composition has the tendency to reduce bond strength at higher temperatures as well, which is undesirable.

SUMMARY

Increasing the loading of core-shell rubber particles in a two-part curable composition, such as an epoxy-based adhesive, can substantially improve toughness and impact performance in the cured product. Conventionally, the core-shell rubber particles are incorporated into the epoxy-containing part of the two-part adhesive or into an epoxy master batch at elevated temperatures, because the epoxy will not react with the acrylate shell polymer of the core-shell rubber particles, making it easier to disperse the core-shell rubber particles therein. In contrast, providing a stable dispersion of the core-shell rubber particles in the amine-containing part of the two-part adhesive poses a significant technical challenge, as the amine group can react with acrylate polymers through amide transesterification reaction, which can significantly increase the mixture viscosity and form an unstable mixture when dispensing at elevated temperatures It is possible to incorporate core-shell rubber particles that are pre-dispersed in an epoxy into the into the amine-containing part by pre-reacting with a stoichiometric excess of the amine. As a disadvantage of this approach, the overall amount of core-shell rubber particles remains limited because epoxy resins with pre-dispersed core-shell rubber particles tend to have a very high initial viscosity, with the amount of the core-shell rubber limited by the amount of epoxy that can be reacted with amine part when preparing the pre-reaction intermediate. High loadings of the core-shell rubber particle in the epoxy would further increase viscosity. This can complicate mixing of the two parts of the curable composition, limit delivery options, and lead to poor handling properties before and after mixing. To remedy this problem, the amount of core-shell rubber additive can be limited, and diluents or plasticizers can be added, but these options limit the performance enhancement that would be otherwise possible.

Here, it was discovered that the presence of a heterogeneous dispersant can enable large amounts of core-shell rubber particles to be incorporated into a low-viscosity amine curative. This can be achieved by shearing a mixture of these components at moderately elevated temperatures under a short time period, thereby avoiding the undesirable reaction between the shell acrylate polymer and the amine. Once the core-shell rubber particles are dispersed into the amine, this dispersion can be either used directly in the curative part, or subsequently reacted with a small amount of an epoxy compound to form a reactive precursor. Either way, high loadings of core-shell rubber particles can be achieved, with uniform distribution of the particles in the cured resin matrix. If desired, additional core-shell rubber particles can be added to the epoxy-containing part. The resulting cured composition can display an extremely high impact performance.

In a first aspect, a curative part useful in a two-part curable composition is provided. The curative part comprises: a liquid amine; a heterogeneous dispersant; and core-shell rubber particles having an elastomeric core and a (meth)acrylic shell, wherein the core-shell rubber particles and the heterogeneous dispersant are collectively shear-dispersed in the liquid amine such that the core-shell rubber particles are substantially non-aggregated and the curative part is phase-stable over a period of at least 3 months at ambient temperature.

In a second aspect, a two-part curable composition comprising the curative part and a base part comprising an epoxy resin is provided.

In a third aspect, a method of making a curative part of a two-part curable composition is provided, the method comprising: combining core-shell rubber particles having an elastomeric core and a (meth)acrylic shell, a heterogeneous dispersant, and a liquid amine to provide a mixture; and shearing the mixture at temperatures from 25° C. to 90° C. until the core-shell rubber particles are dispersed into the liquid amine, thereby providing a curative part capable of being reacted with a base part comprised of an epoxy resin.

Definitions

As used herein:
"ambient conditions" refers to a temperature of 21° C. and 101.3 kPa (1 atmosphere) pressure;
"ambient temperature" refers to a temperature of 21° C.;
"amino" refers to a chemical group containing a basic nitrogen atom with a lone pair (—NHR), and may be either a primary or secondary chemical group;

"average" generally refers to a number average but, when referring to particle diameter, can either represent a number average or volume average;

"cure" refers to the hardening of a resin material achieved by crosslinking of resin molecular chains;

"fully cured" refers to a polymeric material that has sufficiently cured to be useful in its intended application;

"functionality" refers to a group that can be or is substituted onto a molecule or onto an organic group. Examples of functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups.

"halogen" group, as used herein, means a fluorine, chlorine, bromine, or iodine atom, unless otherwise stated;

"particle diameter" represents the largest transverse dimension of a particle;

"polyamine" refers to a compound having an amine functionality of two or more;

"resin" refers to a compound having at least one reactive functionality;

"polyol" refers to a compound having a hydroxyl functionality of two or more;

"sub-micron particles" refers to particulate filler having an average diameter of less than 1 micrometer (which can include nanoparticles having an average diameter of less than 100 nanometers);

"substituted" as used herein in conjunction with a molecule or an organic group as defined herein refers to the state in which one or more hydrogen atoms contained therein are replaced by one or more non-hydrogen atoms;

DETAILED DESCRIPTION

As used herein, the terms "preferred" and "preferably" refer to embodiments described herein that can afford certain benefits, under certain circumstances. However, other embodiments may also be preferred, under the same or other circumstances. Furthermore, recitation of one or more preferred embodiments does not imply that other embodiments are not useful and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein. Relative terms such as left, right, forward, rearward, top, bottom, side, upper, lower, horizontal, vertical, and the like may be used herein and, if so, are from the perspective observed in the particular drawing. These terms are used only to simplify the description, however, and not to limit the scope of the invention in any way.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention.

This disclosure pertains to curable compositions and related methods thereof capable of being used for structural bonding applications. Such bonding applications may include bonding to a variety of substrates, including but not limited to polymeric and metal substrates.

Useful bonding applications include aerospace bonding applications, such as the bonding of skins, stringers, honeycomb materials, and other primary aircraft structures. Other useful bonding applications are in the automotive area, and may involve metal to metal bonding to a frame or another automotive structure.

The provided curable compositions are referred to as two-component ("two-part"), curable compositions because they require the mixing of two distinct parts prior to use. One is commonly referred to as a base part containing one or more curable resins, while the other is a curative part containing components reactive with the curable resin. The base and curative parts are each liquid at ambient temperature, and react upon mixing with each other to form a cured (or hardened) adhesive. The process of curing is not instantaneous, but happens gradually, so that an operator has sufficient working time to apply and shape the adhesive, as needed, for the application at hand.

In exemplary methods of use, the base part and curative part of the curable composition are mixed with each other shortly before applying the composition to either bonding surface. Once mixed, the composition is ready for application and may be dispensed onto one or both bonding surfaces in a bead or layer, as appropriate.

In some embodiments, curing can occur at ambient temperature. If desired, however, curing could be accelerated by heating the mixed composition to elevated temperatures. The gelation time, or time at which the adhesive reaches a fully cured state, can be from 0.05 hours to 8 hours, 0.5 hours to 6 hours, 1 hour to 4 hours, or in some embodiments, less than, equal to, or greater than 0.05 hours, 0.25 hours, 0.5, 0.75, 1, 1.5, 2, 2.5, 3, 3.5, 4, 4.5, 5, 5.5, 6, 6.5, 7, 7.5, or 8 hours.

The steps used to prepare and cure the provided curable compositions can be carried out by any number of entities within a manufacturing supply chain. In some instances, a manufacturer may prepare and package a two-part curable composition for a customer, who then uses the two-part curable composition in an automotive or aerospace manufacturing, maintenance, or repair process. In other instances, the end user may participate at least in part in formulating and mixing the base part and/or curative part of the curable composition.

When cured, the provided curable compositions can achieve acceptable adhesive peel and shear strength at temperatures exceeding 180° F. (82° C.), and in some cases at temperatures of up to 350° F. (177° C.).

In a two-part curable composition, the base and curative parts are stored separately, enabling the curable composition to have a long shelf life when stored at ambient temperature. In some applications, it can be convenient to provide these materials in disposable cartridges for storage and dispensing, such as in the 3M™ EPX™ Applicator System, available from 3M Company, St. Paul, MN.

The base part of the two-part curable composition includes at least one curable resin that is amine-reactive. In some embodiments, one or more of the curable resins are epoxy resins.

Epoxy resins are useful matrix materials for high-performance composites and adhesives. They have an excellent combination of strength, adhesion, low shrinkage, and processing versatility. The base part can include one or more epoxy resins. In some cases, the base part contains a major epoxy and one to three minor epoxies. Minor epoxies can be added to provide viscosity control, impart higher elevated temperature properties, provide lower moisture absorption or to improve toughness.

An epoxy resin has a chemical structure containing a 3-member cyclic ether group, also referred to as an epoxide (or glycidyl) group. The epoxy resin may contain more than one epoxide group, in which case it is referred to as a polyepoxide. Epoxy resins may be saturated or unsaturated, aliphatic, alicyclic, aromatic, or heterocyclic, or a combination thereof. The epoxy resins are hardened by the addition of a curative. Exemplary curatives can include anhydrides, amines, polyamides, Lewis acids, salts and others.

Aromatic polyepoxides contain at least one aromatic ring (such as a phenyl group) that is optionally substituted by a halogen, alkyl having 1 to 4 carbon atoms (e.g., methyl or ethyl), or hydroxyalkyl having 1 to 4 carbon atoms (e.g., hydroxymethyl). In some embodiments, the aromatic polyepoxide contains at least two or more aromatic rings and in some embodiments, can contain 1 to 4 aromatic rings. For polyepoxides and epoxy resin repeating units containing two or more aromatic rings, the rings may be connected, for example, by a branched or straight-chain alkylene group having 1 to 4 carbon atoms that may optionally be substituted by a halogen (e.g., fluoro, chloro, bromo, iodo).

In some embodiments, the epoxy resin is a novolac epoxy resin (e.g., phenol novolacs, ortho-, meta-, or para-cresol novolacs or combinations thereof) containing more than two epoxy groups per molecule. Novolac epoxy resins can be obtained by reacting a phenolic novolac resin with epichlorohydrin. When cured, these resins can provide increased crosslink density due to the increased epoxy functionality, such as provided by a multifunctional epoxy having an average functionality of greater than 2, greater than 3, greater than 4, greater than 5, or greater than 6. The epoxy resin may also include a bisphenol epoxy resin (e.g., bisphenol A, bisphenol E, bisphenol F, halogenated bisphenol epoxies, fluorene epoxies, and combinations thereof), a resorcinol epoxy resin, and combinations of any of these.

Particular aromatic monomeric polyepoxides include the diglycidyl ethers of bisphenol A and bisphenol F and tetrakis glycidyl-4-phenylolethane and combinations thereof. In these aromatic polyepoxides, either of the phenyl rings or the methylene group may be substituted by halogen (e.g., fluoro, chloro, bromo, iodo), methyl, trifluoromethyl, or hydroxymethyl. Useful aromatic polyepoxides also include polyglycidyl ethers of polyhydric phenols, glycidyl esters of aromatic carboxylic acid, N-glycidylaminobenzenes, and glycidylamino-glycidyloxy-benzenes.

Polyglycidyl derivatives of polyhydric phenols include 2,2-bis-[4-(2,3-epoxypropoxy)phenyl]propane and those described in U.S. Pat. No. 3,018,262 (Schroeder) and U.S. Pat. No. 3,298,998 (Coover et al.), and in "Handbook of Epoxy Resins" by Lee and Neville, McGraw-Hill Book Co., New York (1967). Useful polyglycidyl ethers of polyhydric phenols described above are diglycidyl ethers of bisphenol that have pendent carbocyclic groups. Examples of such diglycidyl ethers are 2,2-bis[4-(2,3-epoxypropoxy)phenyl] norcamphane and 2,2-bis[4-(2,3-epoxypropoxy)phenyl] decahydro-1,4,5,8-dimethanonaphthalene. Useful polyglycidyl derivatives include 9,9-bis[4-(2,3-epoxypropoxy) phenyl]fluorene and tetraglycidyl methylene dianiline (TGMDA), also known as tetraglycidyl-4,4 N-diaminodiphenylmethane (TGGDM).

An epoxy resin present in the base part of the curable composition can be any proportion of the curable composition suitable to obtain the desired physical and chemical properties after the composition is cured. The epoxy resin can represent from 30 weight percent (wt %) to 60 wt %, 40 wt % to 55 wt %, or 45 wt % to 50 wt % of the curable composition, or in some embodiments, less than, equal to, or greater than 30 wt %, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt % of the curable composition.

Where an epoxy resin in the base part is a multifunctional epoxy having an average functionality greater than 2, the epoxy resin can represent from 0.1 wt % to 70 wt %, 5 wt % to 50 wt %, or 5 wt % to 40 wt % of the curable composition, or in some embodiments, less than, equal to, or greater than 0.1 wt %, 0.2, 0.3, 0.5, 0.7, 1, 2, 3, 5, 7, 10, 12, 15, 18, 20, 25, 30, 35, 40, 45, 50, 55, 60, 65, or 70 wt % of the curable composition.

The base part of the curable composition may contain one or more curable resins that are not epoxy resins. These curable resins can also be amine-reactive. Such curable resins can include, for example, polyisocyanates, acrylates, liquid bismaleimides and other amine-reactive resins. The base part may also contain combinations of one or more of these resins with any of the epoxy resins disclosed herein, or with each other.

The curative part of the curable composition contains one or more amines. In various embodiments, the amines are aliphatic or cyclic amines. Generally, these amines are capable of reacting with the one or more multifunctional epoxy resins in the base part to form a highly crosslinked resin matrix. In various embodiments, the amines are selected from the group consisting of cycloaliphatic amines, polyethylene polyamines, amine-terminated piperazines, imidazoles, and combinations thereof.

Of the amines in the curative part, at least one amine is a liquid under ambient conditions. Exemplary liquid amines include, but are not limited to, tetraethylenepentamine, N-aminoethylpiperazine, bis(aminopropyl)piperazine, diethylenetriamine, triethylenetetramine, 4,7,10-trioxatridecane-1,13-diamine, octahydro-4,7-methano-1H-indenedimethylamine, bicyclo[2.2.1]heptanebis(methylamine), meta-xylenediamine, isophoronediamine, cyclohexanediamine, and combinations thereof.

In some embodiments, the liquid amine is a primary amine. In some embodiments, the amine has a cyclic structure. Beneficially, having a cyclic structure can enhance the high temperature performance of the paste adhesive. Octahydro-4,7-methano-1H-indenedimethylamine, sometimes referred to as TCD-diamine, has the chemical structure (I) below:

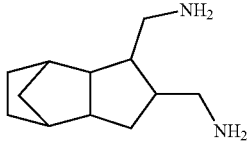

The same amine may be expressed more generically by the chemical structure (II) below:

Another useful amine is bicyclo[2.2.1]heptanebis(methylamine), also sometimes referred to as norbornane diamine (NMDA):

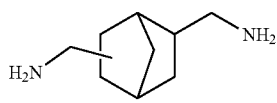

The amine preferably has a low viscosity at ambient conditions, helping enable a significant amount of core-shell rubber tougheners to be dispersed therein.

The viscosity of the amine alone can range from 1 centipoise to 10,000 centipoise, 1 centipoise to 1000 centipoise, or 1 centipoise to 500 centipoise under ambient conditions, or in some embodiments, be less than, equal to, or greater than, 1 centipoise, 2; 5; 8; 10; 15; 20; 25; 30; 35; 40; 50; 60; 70; 80; 90; 100; 120; 150; 200; 300; 400; 500; 700; 1,000; 1,500; 2,000; 2,500; 3,000; 4,000; 5,000; 6,000; 7,000; 8,000; 9,000; or 10,000 centipoise under ambient conditions. Viscosity can be measured, for example, by a Brookfield LV-series viscometer provided by Brookfield AMETEK, Middleboro, MA.

The amine can be any proportion of the curable composition suitable to obtain suitable physical and chemical properties after the composition is cured, subject to upper limits of acceptable viscosity in the curative part of the curable composition. In some embodiments, the amine represents from 45 wt % to 95 wt %, 50 wt % to 95 wt %, or 60 wt % to 95 wt % of the curable composition, or in some embodiments, less than, equal to, or greater than 45 wt %, 46, 47, 48, 49, 50, 51, 52, 53, 54, 55, 56, 57, 58, 59, 60, 65, 70, 75, 80, 85, 90, 91, 92, 93, 94, or 95 wt % of the curative part.

The curative part of the provided curable compositions contains core-shell rubber particles. Optionally, both the base part and curative part of the provided curable compositions can contain core-shell rubber particles.

Core-shell rubber particles have an elastomeric core made from either a physically crosslinked or microphase-separated polymer, and a surrounding shell layer made from a non-elastomeric glassy polymer. Advantageously, the rubbery, elastomeric core can enhance toughness in the cured resin composition, while the glassy polymeric shell can impart improved compatibility between the filler particle and the matrix component of the curable resin.

The shell polymer is commonly an acrylate-based polymer. Addition of core-shell rubber particles to the amine curative side, advantageously, can decrease viscosity of the epoxy part, and enable further addition of tougheners to the epoxy-containing part, and/or enable use of solid epoxy resins, while preserving acceptable handling properties. At the same time, inclusion of core-shell rubber particles in the curative part can allow the curative part to have a higher amine equivalent weight. This in turn can help bring the weight ratios of base and curative parts closer to each other, and improve mixing homogeneity when the two parts are mixed.

In exemplary composite applications, the core-shell rubber particles can have a particle diameter in the range of from 10 nm to 1000 nm, from 50 nm to 500 nm, or from 80 nm to 300 nm, or in some embodiments, less than, equal to, or greater than 5 nm, 10, 20, 30, 40, 50, 70, 100, 200, 300, 400, 500, 600, 700, 800, 900, or 1000 nm.

Prior to curing, the core-shell rubber particles are preferably uniformly dispersed in the curative part, with the assistance of a heterogeneous dispersant to minimize the reaction between the shell layers of the core-shell rubber particles, reduce viscosity, and improve core-shell dispersion stability. The heterogeneous dispersant is generally a solid at ambient temperature and insoluble in the amine and other components of the curative part. When dispersing the core-shell rubber particles in the curative part, typically through a high shear mixing process, the heterogeneous dispersant acts to increase dispersion energy for breaking up agglomerates of core-shell rubber particles, allowing fast dispersion of the core-shell particles at lower temperatures than otherwise possible. Reaction of the amine group with acrylate groups on the core-shell rubber particles can thus be minimized.

In a preferred embodiments, substantially all of the core-shell rubber particles are uniformly dispersed (i.e., non-aggregated) within the curable part, although it is understood that some residual amount of aggregation could exist. The dispersed nature of the core-shell rubber particles can be substantially preserved when the base part and curative part are mixed together, and the curable composition is cured.

The heterogeneous dispersant can be a thixotropic agent, which imparts a time-dependent shear thinning property to a composition to which it is added. Thixotropic behavior can allow a composition to become fluid when agitated but assume a higher viscosity and/or avoid undesirable sag or flow when at rest. Useful heterogeneous dispersants include fumed silica, phyllosilicate clay, polyamide wax, and combinations thereof. These additives can build a thixotropic network after being dispersed or incorporated into the liquid amine, while facilitating dispersion of the core-shell rubber particles within the liquid amine and lowering dispersion temperatures.

The heterogeneous dispersant is present in an amount sufficient for the core-shell rubber particles to form a stable dispersion in the curative part. Optionally, the heterogeneous dispersant can be added later where core shell rubber particles are pre-dispersed into the curative part during compounding. The heterogeneous dispersant can be from 0.05% to 20%, from 0.1% to 10%, from 0.3% to 5%, or in some embodiments, less than, equal to, or greater than 0.05%, 0.1, 0.2, 0.5, 0.7, 1, 2, 3, 4, 5, 6, 7, 8, 9, 10, 11, 12, 13, 14, 15, 16, 17, 18, 19, or 20% by weight relative to the overall weight of the curative part.

The heterogeneous dispersant operates in combination with the core-shell rubber particles to provide a curative part that is phase-stable, meaning that the curative part does not macroscopically phase separate when at rest at ambient temperature for a substantial amount of time. The curative part can be phase-stable over a period of at least 3 months, at least 6 months, at least 12 months, or in some embodiments, less than, equal to, or greater than 1 month, 2, 3, 4, 5, 6, 7, 8, 9, 10, 11, 12, 13, 14, 15, 16, 17, 18, 19, 20, 21, 22, 23, or 24 months at ambient temperature.

The heterogeneous dispersant may itself be fully dispersed into the curative part as primary particles or at least partially aggregated. In an aggregated configuration, two or more primary particles are in contact with each other. Aggregated configurations can also include long linear or branched chains of aggregated primary particles.

The heterogeneous dispersant can have a primary particle size of from 20 nanometers to 800 nanometers, from 30 nanometers to 500 nanometers, from 50 nanometers to 300 nanometers, or in some embodiments, less than, equal to, or greater than 20 nanometers, 25, 30, 35, 40, 45, 50, 55, 60, 65, 70, 75, 80, 85, 90, 95, 100, 110, 120, 150, 170, 200, 250, 300, 350, 400, 450, 500, 550, 600, 650, 700, 750, or 800 nanometers.

The particle diameter distribution of the core-shell rubber particles can be monomodal or multimodal. A monomodal particle diameter distribution is characterized by a single peak (or mode) in a particle diameter distribution, while a multimodal distribution is characterized by two or more peaks in the particle diameter distribution. A multimodal distribution can be a bimodal distribution characterized by exactly two peaks, a trimodal distribution with exactly three peaks, and so forth.

In some embodiments, the multimodal distribution of the core-shell rubber particles has a first mode (as determined by transmission electron microscopy) characterized by a particle size "D1" in the range of from 120 nm to 500 nm, 160 nm to 425 nm, or 200 nm to 350 nm. In some embodiments, the particle size of the first mode is less than, equal to, or greater than 100 nm, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 550, 600, 650, 700, 750, 800, 850, 900, 950, or 1000 nm.

A multimodal distribution of the core-shell rubber particles also displays a second mode characterized by a particle diameter "D2" less than that corresponding to the first mode. In some embodiments, D2 is in the range of from 30 nm to 200 nm, 40 nm to 150 nm, or 50 nm to 100 nm. In some embodiments, the particle size of the first mode is less than, equal to, or greater than, 30 nm, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 nm.

As described herein, the first and second modes are defined relative to each other such that the particle diameter of the first mode D1 is greater than the particle diameter of the second mode, D2. In some embodiments, the ratio D1:D2, is at least 1.5:1, at least 2:1, at least 4:1, or at least 10:1. Generally, the ratio of D1:D2 is no greater than 10:1. In some embodiments, the ratio D1:D2 is less than, equal to, or greater than 1.5:1, 2:1, 3:1, 4:1, 5:1, 6:1, 7:1, 8:1, 9:1, or 10:1.

In some embodiments, the elastomeric core is comprised of a polymer having a low glass transition temperature enabling rubbery behavior, such as less than 0° C., or less than 30° C. More broadly, the glass transition temperature of the core polymer can be in the range of −100° C. to 25° C., −85° C. to 0° C., or −70° C. to −30° C., or in some embodiments, less than, equal to, or greater than −100° C., −95, −90, −85, −80, −75, −70, −65, −60, −55, −50, 45, −40, −35, −30, −25, −20, −15, −10, −5, 0, 5, 10, 15, 20, or 25° C. The glass transition temperature can be determined using Differential Scanning calorimetry (DSC) analysis or a similar method.

Suitable core polymers broadly include various rubbers and polymers and copolymers of conjugated dienes, acrylates, and methacrylates. Such polymers can include, for example, homopolymers of butadiene or isoprene, or any of a number of copolymers of butadiene or isoprene with one or more ethylenically unsaturated monomers, which may include vinyl aromatic monomers, acrylonitrile, methacrylonitrile, acrylates, and methacrylates. Alternatively, or in combination with the above, the core polymer could include a polysiloxane rubber-based elastomer.

The shell polymer need not be particularly restricted and can be comprised of any suitable polymer, including thermoplastic and thermoset polymers. Optionally, the shell polymer is crosslinked. In some embodiments, the shell polymer has a glass transition temperature greater than ambient temperature, i.e., greater than 25° C. The glass transition temperature of the shell polymer can be in the range of 30° C. to 170° C., 55° C. to 150° C., or 80° C. to 130° C.; or in some embodiments, less than, equal to, or greater than 30° C., 35, 40, 45, 50, 55, 60, 65, 70, 75, 80, 85, 90, 95, 100, 105, 110, 115, 120, 125, 130, 135, 140, 145, 150, 155, 160, 165, or 170° C.

Suitable shell polymers include polymers and copolymers of dienes, acrylates, methacrylates, vinyl monomers, vinyl cyanides, unsaturated acids and anhydrides, acrylamides, and methacrylamides. Specific examples of suitable shell polymers include, poly(methylmethacrylate), polystyrene, polyacrylonitrile, polyacrylic acid, and methylmethacrylate butadiene styrene copolymer.

The relative proportions of the core polymer and shell polymer in a given core-shell particle need not be restricted. In some embodiments, the core represents on average 50 wt % to 95 wt % of the core-shell rubber particles while the outer shell represents or 5 wt % to 50 wt % of the core-shell rubber particles. In other embodiments, the outer shell layer represents on average from 0.2 wt % to 7 wt % of the core-shell particle. In further embodiments, the outer shell layer represents on average less than, equal to, or greater than, 0.1 wt %, 0.2, 0.3, 0.4, 0.5, 0.7, 1, 2, 3, 4, 5, 6, 7, 8, 9, 10, 12, 15, 17, 20, 25, 30, 35, 40, 45, or 50 wt % of the core-shell particle.

In some embodiments, each core-shell particle includes one or more polymeric intermediate shell layers disposed between the elastomeric core and the outer shell layer. The introduction of an intermediate layer provides another way to tailor the chemical and physical properties of the core-shell rubber particles. It may be advantageous, for instance, to provide an intermediate layer that acts as a primer, or tie layer, that improves adhesion between the core polymer and outer shell polymer. Use of an intermediate layer can also help adjust the rheological properties of the composition while preserving particular interfacial characteristics between the outer shell polymer and matrix component of the curable composition. In various embodiments, the polymeric outer shell layer has a greater degree of unsaturation (e.g., having a greater density of double-bonds) than that of the polymeric intermediate layer.

An intermediate layer, like the outer shell layer, may be polymerized in situ from any of a number of suitable monomers known in the art, including monomers useful for the outer shell layer. An intermediate layer can be, for example, derived from a polymer or copolymer of an acrylate, methacrylate, isocyanuric acid derivative, aromatic vinyl monomer, aromatic polycarboxylic acid ester, or combination thereof, while the outer shell layer can be, for example, derived from a polymer or copolymer of an acrylate, methacrylate, or combination thereof.

Dispersing core-shell rubber particles into a curable composition, and particularly a curable composition based on an epoxy resin, can improve the toughness of the cured composition in different ways. As an example, the core polymer can be engineered to cavitate on impact, which dissipates energy. Core-shell rubber particles can also intercept and impede the propagation of cracks and relieve stresses that are generated during the curing of the matrix resin material.

The core-shell rubber particles can be any proportion of the curable composition suitable to obtain the desired impact resistance after the composition is cured. In some embodiments, the core-shell rubber particles represent from 0.1 wt % to 20 wt %, 1 wt % to 20 wt %, 5 wt % to 15 wt % of the curable composition, or in some embodiments, less than, equal to, or greater than 0.1 wt %, 0.2, 0.3, 0.5, 0.7, 1, 1.5, 2, 2.5, 3, 4, 5, 6, 7, 8, 9, 10, 11, 12, 13, 14, 15, 16, 17, 18, 19, or 20 wt % of the curable composition.

In an exemplary embodiment, the curable composition is comprised of a 50:50 wt %:wt % blend of Bisphenol A and Bisphenol F epoxy resins, and 5 wt % of a core-shell particle filler with a bimodal particle size distribution.

Core-shell rubber particles can be made using any known method. In one method, core-shell rubber particles are made by a graft polymerization method in which a shell monomer, such as a vinyl polymerizable monomer, is graft polymerized onto the surface of a crosslinked rubber core polymer whereby covalent bonds connect the core and shell layer. A similar method can be used to dispose an outer shell polymer onto an intermediate layer, which is in turn disposed on the crosslinked rubber core.

Preparation of the elastomeric cores of the core-shell rubber particles can take place using a seed emulsion polymerization method. In this process, a seed latex is initially prepared by emulsion polymerization and acts as nucleation sites for further polymerization. The seed latex particles are then subjected to a growth step in which they are swollen with additional monomer to grow the particles to a larger size, after which the monomer is polymerized. Further details concerning this process are described, for example, in U.S. Patent Publication No. 2009/0298969 (Attarwala et al.).

Exemplary core-shell polymers and their preparation are described in U.S. Pat. No. 4,778,851 (Henton et al.). Commercially available core-shell polymers can be obtained, for example, under the trade designation PARALOID (e.g., PARALOID EXL 2600 and PARALOID EXL 2691) from Rohm & Haas Company in Philadelphia, PA and under the trade designation KANE ACE (e.g., KANE ACE B564, KANE ACE MX120, KANE ACE MX257, and KANE ACE MX153) from Kaneka North America LLC, Pasadena, TX.

In preparing the curative part of the two-part curable composition, the core-shell rubber particles and heterogeneous dispersant collectively dispersed in the liquid amine can be used as a masterbatch, and further diluted with the liquid amine as appropriate to obtain a desired viscosity for mixing with the base part. The masterbatch may also be diluted with other components, including as other reactive amines, if desired. It was discovered that the addition of solid thixotropic agents can help disrupt aggregation of the core-shell rubber particles and at the same time stabilize the particles in the liquid. The lower viscosity of the amine curative can make this approach suitable to practice.

In various embodiments, the liquid amine can be reacted with a small amount of an epoxy resin (including, for example, any of the epoxy resins previously described) to provide a reactive precursor having an increased amine equivalent weight. This reaction can take place either before or after the shear-induced dispersion of the core-shell rubber particles and heterogeneous dispersant.

Advantageously, this pre-reaction of the amine with an epoxy resin, along with core-shell rubber particles in the curative side increases viscosity of the curative part, which can help balance out the viscosities of the base and curative parts. As a further advantage, this pre-reaction mixture with core-shell rubber particles can help mitigate the problem of amine blushing, a phenomenon caused by reaction of the amine with ambient moisture and characterized by an oily or waxy appearance on the surface of a cured epoxy. The reduced concentration of amine groups and higher viscosity can significantly slow the undesirable reaction of the amine groups and ambient carbon dioxide and carbon dioxide contained within the resin layer.

The curable composition may contain any number of other useful optional additives. Useful additives include, for example, additional curatives, curing catalysts or accelerators, adhesion promoters, fillers, rheology modifiers, pigments, additional rubbers, diluents (which may be reactive), plasticizers, extenders, fire-retarding agents, thixotropic agents, flow control agents, thickeners such as thermoplastic polyesters, gelling agents such as polyvinylbutyral, fillers, dyes, and antioxidants.

The provided curable compositions may, for example, contain one or more curing accelerators. Curing accelerators can include, for example, calcium nitrate tetrahydrate or calcium nitrate dehydrate and tertiary amine accelerators such as 2,4,6-tri(dimethylaminomethyl) phenol, such as described in U.S. Pat. No. 4,518,749 (Waddill), U.S. Pat. No. 4,800,222 (Waddill), and U.S. Pat. No. 6,773,754 (Whiter). Such accelerators can be incorporated into either the base or curative part to reduce the time to gelation, or curing time.

As a further option, the provided curable compositions can contain any number of other inorganic sub-micron particles known in the art. Inorganic sub-micron particles include, for example, inorganic nanoparticles. Such particles may be present in the base part, curative part, or both.

Exemplary additives may include one or more of silica gels, calcium silicates, phosphates, molybdates, carbon black, clays such as bentonite, organo-clays, aluminium-trihydrates, hollow-glass-microspheres; hollow-polymeric microspheres and calcium carbonate. In some embodiments, these fillers can be used to adjust modulus, promote adhesion, improve corrosion resistance, control the rheological properties of the adhesive, and/or reduce shrinkage during curing.

Exemplary commercial fillers include SHIELDEX AC5 (a synthetic amorphous silica, calcium hydroxide mixture available from W.R. Grace in Columbia, MD, USA); CAB-O-SIL TS 720 (a hydrophobic fumed silica-treated with polydimethyl-siloxane-polymer available from Cabot GmbH in Hanau, Germany); AEROSIL VP-R-2935 (a hydrophobically fumed silica available from Degussa in Dusseldorf, Germany); glass-beads class IV (250-300 microns): Micro-billes de verre 180/300 (available from CVP S.A. in France); glass bubbles K37: amorphous silica (available from 3M Deutschland GmbH in Neuss, Germany); and APYRAL 24 ESF (epoxysilane-functionalized (2 wt %) aluminium trihydrate available from Nabaltec GmbH in Schwandorf, Germany).

Inclusion of small amounts of inorganic sub-micron particles can provide a significant increase of modulus in the cured composition. Advantageously, this increase in modulus can partially or fully offset the decrease in modulus attributable to the presence of core-shell rubber particles in the curable composition while preserving the high degree of fracture toughness imparted by the core-shell rubber particles.

Useful sub-micron particles can include surface-bonded organic groups that serve to improve compatibility between the inorganic sub-micron particles and the epoxy resin. Useful sub-micron particles include sub-micron particles derived from silicon dioxide (i.e., silica) and calcium carbonate.

Exemplary methods of making the curative part of the two-part curable composition include combining core-shell rubber particles, a heterogeneous dispersant, and a liquid amine to provide a mixture, and then shearing the mixture until the core-shell rubber particles are dispersed into the liquid amine. The shearing process can take place at temperatures from 25° C. to 90° C., from 30° C. to 80° C., from 40° C. to 80° C., or in some embodiments, less than, equal to, or greater than 35° C., 45, 65, 75, or 90° C.

The combining and shearing steps above can be carried out sequentially, can be carried out simultaneously, or some degree of both.

The way in which a suitable degree of shear is imparted to de-aggregate the core-shell rubber particles in the liquid amine is not particularly limited. Useful shearing methods include shearing with a rotary high-shear impeller such as a cowles blade. Alternatively, shearing can be provided by sonic means, such as through the use of an ultrasonic horn.

While not intended to be exhaustive, further exemplary embodiments are provided as follows:

1. A curative part useful in a two-part curable composition, the curative part comprising: a liquid amine; a heterogeneous dispersant; and core-shell rubber particles having an elastomeric core and a (meth)acrylic shell, wherein the core-shell rubber particles and the heterogeneous dispersant are collectively shear-dispersed in the liquid amine such that the core-shell rubber particles are substantially non-aggregated and the curative part is phase-stable over a period of at least 3 months at ambient temperature.
2. The curative part of embodiment 1, wherein the heterogeneous dispersant is a solid thixotropic agent.
3. The curative part of embodiment 1 or 2, wherein the heterogeneous dispersant comprises one or more of fumed silica, phyllosilicate clay, or polymer amide wax.
4. The curative part of any one of embodiments 1-3, wherein the heterogeneous dispersant is present in an amount of from 0.05% to 20% by weight relative to the overall weight of the curative part.
5. The curative part of any one of embodiments 1-4, wherein the heterogeneous dispersant has a primary particle size of from 20 nanometers to 800 nanometers.
6. The curative part of any one of embodiments 1-5, wherein the core-shell rubber particles are present in an amount of from 0.1% to 30% by weight relative to the overall weight of the curative part.
7. The curative part of any one of embodiments 1-6, wherein the core-shell rubber particles have a median particle size of from 20 nanometers to 1000 nanometers.
8. The curative part of any one of embodiments 1-7, wherein the liquid amine is present in an amount of from 10% to 90% by weight relative to the overall weight of the curative part.
9. The curative part of any one of embodiments 1-8, wherein the liquid amine comprises one or more of tetraethylenepentamine, N-aminoethylpiperazine, bis(aminopropyl)piperazine, diethylenetriamine, triethylenetetramine, 4,7,10-trioxatridecane-1,13-diamine, octahydro-4,7-methano-1H-indenedimethylamine, bicyclo[2.2.1]heptanebis (methylamine), meta-xylenediamine, isophoronediamine, and cyclohexanediamine.
10. The curative part of any one of embodiments 1-9, wherein the curative part further comprises a branched polytetrahydrofuran having a secondary amine and/or tertiary amine functionality.
11. A two-part curable composition comprising the curative part of any one of embodiments 1-10 and a base part comprising an epoxy resin.
12. The two-part curable composition of embodiment 11, wherein the base part further comprises core-shell rubber particles.
13. A method of making a curative part of a two-part curable composition, the method comprising: combining core-shell rubber particles having an elastomeric core and a (meth)acrylic shell, a heterogeneous dispersant, and a liquid amine to provide a mixture; and shearing the mixture at temperatures from 25° C. to 90° C. until the core-shell rubber particles are dispersed into the liquid amine, thereby providing a curative part capable of being reacted with a base part comprised of an epoxy resin.
14. The method of embodiment 13, wherein the core-shell rubber particles are substantially non-aggregated.
15. The method of embodiment 13 or 14, wherein the heterogeneous dispersant comprises one or more of fumed silica, phyllosilicate clay, or polyamide wax.

EXAMPLES

Objects and advantages of this disclosure are further illustrated by the following non-limiting examples, but the particular materials and amounts thereof recited in these examples, as well as other conditions and details, should not be construed to unduly limit this disclosure. Unless otherwise noted, all parts, percentages, ratios, etc. in the Examples and the rest of the specification are by weight.

TABLE 1

Materials

| Designation | Description | Source |
| --- | --- | --- |
| 2167 | Polyamide amine curing agent, available under the designation ANCAMINE 2167 | Evonik Industries AG, Essen, Germany |

TABLE 1-continued

Materials

| Designation | Description | Source |
| --- | --- | --- |
| 2482 | Polyamide amine curing agent, available under the designation ANCAMINE 2482 | Evonik Industries AG |
| 2691J | Low temperature impact modifier, available under the trade designation PARALOID EXL-2691J | Dow Corning, Midland, MI, United States |
| Alcoa123 | Atomized aluminum powder, available under the designation Alcoa 123 | Alcoa Corporation, Pittsburgh, PA United States |
| C-100T | Art-pearl cross-linked polyurethane beads, available under the designation C-100T | Negami Chemical Industrial Co, Ltd, Ishikawa, Japan |
| DESMODUR W | A cycloaliphatic diisocyanate, available under the trade designation DESMODUR W | Covestro AG, Leverkusen, Germany |
| DBD | Dibutyltin dilaurate | Sigma Aldrich, St. Louis, MO, United States |
| DGE | Resorcinol diglycidyl ether | CVC Thermoset Specialties, Moorestown, NJ, United States |
| DY965 | Polyurethane polyol, available under the designation Flexibilizer DY 965 | Huntsman Corporation, The Woodlands, TX, United States |
| E757 | 1,4-Cyclohexandimethanoldiglycidylether, available under the trade designation EPODIL 757 | Evonik Industries AG |
| E828 | Medium viscosity difunctional liquid epoxy resin, available under the trade designation EPOKITE Resin 828 | Hexion Specialty Chemicals, Louisville, KY, United States |
| G293-100 | Elastomer modified carboxyl-terminated butadiene-acrylonitrile epoxy resin, available under the trade designation EPOTUF G293-100 | Reichhold, Research Triangle Park, NC, United States |
| I75 | Calcium carbonate, a premium, surface modified, ultra-fine particle size, beneficiated, wet ground marble, available under the designation ImerSeal 75 | Fitz Chem LLC, Itasca, IL, United States |
| MX154 | A bisphenol A epoxy resin containing polybutadiene core shell rubber, available under the trade designation KANE ACE MX 154 | Kaneka Texas Corporation, Pasadena, TX, United States |
| MX257 | A bisphenol A epoxy resin containing polybutadiene core shell rubber, available under the trade designation KANE ACE MX 257 | Kaneka Texas Corporation |
| MY721 | A tetrafunctional epoxy resin, available under the trade designation ARALDITE MY-721 | Huntsman Corporation |
| THF-100 | Polyetheramine, available under the trade designation JEFFAMINE THF-100 | Huntsman Corporation |
| THF-170 | Polyetheramine, available under the trade designation JEFFAMINE THF-170 | Huntsman Corporation |
| T2000 | Polyether glycol, available under the trade designation TERATHANE PTMEG | The LYCRA Company LLC, Wilmington, DE, United States |
| TS720 | A synthetic, hydrophobic, amorphous silica, available under the trade designation CAB-O-SIL TS-720 | Cabot Corporation, Boston, MA, United States |
| TTD | 4,7,10-Trioxa-1,13-tridecanediamine | Sigma Aldrich |
| Z-6040 | 3-glycidoxypropyltrimethoxysilane, available under the trade designation DOWSIL Z-6040 SILANE | Dow Corning |

Test Methods

Grade 2024-T3 bare aluminum panels were obtained from Erickson Metals of Minnesota, Inc., Coon Rapids, Minnesota Prior to bonding with structural adhesive, the panels were subjected to the following panel preparation process.

Panel Preparation

A bare aluminum panel was soaked in OAKITE 165 (BASF Corporation) caustic wash solution for ten minutes at 85"C (185° F.). The panel was then immersed in tap water for ten minutes at 21° C. (69.8° F.), followed by a continuous spray rinsing with tap water for approximately three minutes. The panel was then immersed in a Forest Products Laboratory (FPL) etch solution for ten minutes at 66° C. (151° F.), after which the panel was spray rinsed with water for approximately three minutes at 21° C. 69.8° F.), allowed to drip dry for another ten minutes, then dried in an oven for thirty minutes at 54° C. The etched panel was ready to bond with an adhesive and it was used within 8-12 hours.

Overlap Shear Testing (OST)

FPL etched panels of 2024-T3 bare aluminum measuring 10.16 cm×17.78 cm×0.16 cm (4 inches long×7.0 inches× 0.063 inches) were prepared for testing as described above under "Panel Preparation". The etched panels were bonded to one another in an overlapping relationship along their lengthwise dimension. An adhesive corresponding to the example or comparative example was applied onto the end of an etched aluminum panel measuring 10.16 cm×17.78 cm×0.16 cm (4 inches×7 inches×0.063 inches). A second equally sized etched aluminum panel was then applied over the adhesive at an overlap of 12.7 mm (0.5 inches), and the assembly pressed between metal blocks at an approximate pressure of 13.8-34.5 kPa (2-5 psi). The panel assembly was cured at 21.1° C. (70° F.) overnight, and then baked at 175° C. for 25 minutes, and then cut into 2.54 cm by 17.78 cm (1-inch by 7-inch) strips. Overlap shear strength was measured according to ASTM D-1002, by means of a model "SINTECH-30" tensile tester, obtained from MTS Corporation, Eden Prairie, Minnesota, at a grip separation rate of 1.3 mm/min (0.05 inches/minute). Six test panels were prepared and evaluated per each example. The test was conducted at ambient temperature and at 82.8° C. (181° F.).

Floating Roller Peel (FRP) Strength Test

The methods of EN2243-2:2006 were followed. Etched panels of 2024-T3 bare aluminum measuring 20.3 cm×7.6 cm×0.16 cm (8.0 inches×3.0 inches×0.063 inches), and 25.4 cm×7.6 cm×0.064 cm (10 inches×3 inches×0.025 inch), were prepared for testing as described above under "Panel Preparation". An adhesive corresponding to the example or comparative example was applied onto etched panels of 2024-T3 bare aluminum measuring 20.3 cm×7.6 cm×0.16 cm. Primed 25.4 cm×7.6 cm×0.064 aluminum panel was then applied over a 20.3 cm×7.6 cm×0.16 cm panel on which the adhesive was already applied. The assembly was then pressed between metal blocks at an approximate pressure of 2-5 psi (13.8-34.5 KPa). The panel assembly was cured at 21.1° C. (70° F.) overnight, and then baked at 175° C. for 25 minutes, then evaluated for floating roller peel strength in accordance with ASTM D-3167-76 with the following modification. Five samples were tested for each example or comparative example and the average value (in N/25 mm) was reported. Test strips measuring 1.27 cm (0.5 inches) wide were cut along the lengthwise direction of the bonded aluminum panels. The test was conducted at a rate of 30.5 cm/minute (6 inches/minute) at ambient temperature. In each test, the thinner substrate was peeled from the thicker one, and the results normalized to a width of 25 mm (approximately 1 inch).

Wedge Impact Test:

Impact peel resistance was measured according to ISO 11343. Testing was performed at an operating speed of 2 m/sec (6.56 ft/sec) on a 0.75 mm (0.029 inches) cold rolled steel 1403 substrate with a bonded area of 30 mm×20 mm (1.18 inch×0.79 inch) and an adhesive layer of 0.2 mm (0.0079 inch). Two specimens were tested for each adhesive.

Preparatory Example 1 (PE1)

72 grams of 2691J was added into 300 grams of TTD and 1.5 grams of TS720. The mixture was held at 60-80° C. and mixed at high speed using a cowles blade at 1500 rpm for approximately 60 minutes until the impact particles were uniformly dispersed into the amine.

Comparative Preparatory Example 1 (CPE1)

72 grams of 2691J was added into 300 grams of TTD without TS720. The mixture was held at 60-90° C. and mixed at high speed using a cowles blade at 1500 rpm for approximately 120 minutes until the impact particles were uniformly dispersed into the amine. The mixture showed higher viscosity after making and also showed phase separation after 7 days storage at ambient temperature.

Preparatory Example 2 (PE2)

200 grams of T2000, 52.47 g Desmodur W, and 0.13 grams DBD were mixed and heated to 85° C. (185° F.) under agitation. The mixture was held at 85° C. (185° F.) for three hours. 15.24 grams of the glycidol were added under agitation and continually agitated for another two hours. Fourier-Transform Infrared (FTIR) Spectroscopy was continuously conducted on the mixture analyzing for the disappearance of the isocyanate peak (NCO). Agitation stopped when the NCO peak is disappeared, and mixture was discharged into a container and allowed to cool to ambient temperature.

Comparative Examples 1-2 and Examples 1-3 (EX1-EX3)

Preparation of Part A

Step 1: Predefined quantities (in parts by weight) of MX154 or MX257 were added to predefined quantities (in grams) of 2482, TTD and/or 2167 as represented in Table 2. The components were then mixed thoroughly using a SPEEDMIXER DAC 400 FVZ high-speed shear mixer from Flack Tek, Inc. of Landrum, SC, United States at 2200 rpm for two to five minutes. The mixture was heated to 80° C. under agitation and hold for 60 mins. The mixture was cooled to ambient temperature.

Step 2: Predefined quantities (in parts by weight) of PE1, DY965, THF-170, THF-100, and/or C-100T as represented in Table 2, were added to the mixture and mixed for three to five minutes at 2200 rpm.

Step 3: Predefined quantities of TS720 (in parts by weight), as represented in Table 2, were added and the mixture was mixed for four minutes at 2200 rpm. The walls of the mixing bowl were scraped to ensure uniform mixing.

Step 4: Predefined quantities of any remaining material (in parts by weight) were added, and the mixture was mixed again for two to five minutes.

TABLE 2

| Part A Compositions (parts by weight) | | | | | |
|---|---|---|---|---|---|
| | CE1 | CE2 | EX1 | EX2 | EX3 |
| MX154 | 0.00 | 0.00 | 0.00 | 0.00 | 9.06 |
| MX257 | 4.88 | 4.88 | 4.96 | 5.13 | 0.00 |
| 2482 | 16.28 | 16.3 | 16.5 | 17.1 | 32.75 |
| TTD | 20.05 | 20.1 | 0.00 | 0.00 | 0.00 |
| 2167 | 13.02 | 13.0 | 13.2 | 13.7 | 17.06 |
| PE1 | 0.00 | 0.00 | 25.4 | 26.3 | 20.25 |
| DY965 | 16.28 | 16.3 | 16.5 | 13.7 | 0.00 |
| THF-170 | 6.02 | 6.02 | 6.11 | 6.32 | 16.75 |
| THF-100 | 6.51 | 6.51 | 6.61 | 6.83 | 0.00 |
| C-100T | 6.51 | 6.51 | 0.00 | 0.00 | 0.00 |
| I75 | 5.53 | 5.53 | 8.93 | 9.22 | 2.38 |

TABLE 2-continued

Part A Compositions (parts by weight)

|  | CE1 | CE2 | EX1 | EX2 | EX3 |
|---|---|---|---|---|---|
| Alcoa123 | 3.26 | 3.26 | 0.00 | 0.00 | 0.00 |
| TS720 | 1.66 | 1.66 | 1.69 | 1.74 | 1.66 |

Preparation of Part B

Step 1: Predefined quantities (in parts by weight) of E757, MY721, E828, MX157, G293-100, DY965, PE2, DGE, Z6040 and other epoxy resins, as represented in Table 3, were mixed with a SPEEDMIXER DAC 400 FVZ high-speed shear mixer at 2200 rpm for two to five minutes until the components mixed thoroughly. The mixture was then cooled to ambient temperature.

Step 2: Predefined quantities of TS720 and the remaining materials (in grams), as represented in Table 3, were added and the mixture was mixed for four minutes at 2200 rpm. The walls of the mixing bowl were scraped to ensure uniform mixing.

TABLE 3

Part B Compositions (parts by weight)

|  | CE1 | CE2 | EX1 | EX2 | EX3 |
|---|---|---|---|---|---|
| E757 | 0.00 | 0.00 | 0.00 | 0.00 | 8.1 |
| MY721 | 0.00 | 14 | 15.4 | 15.4 | 28.4 |
| E828 | 24.57 | 21 | 23.1 | 19.3 | 0.00 |
| MX154 | 29.48 | 37.7 | 41.4 | 45.3 | 58.7 |
| G293-100 | 9.83 | 8.77 | 9.63 | 9.63 | 0.00 |
| C-100T | 9.83 | 8.98 | 0.00 | 0.00 | 0.00 |
| DGE | 7.37 | 0.00 | 0.00 | 0.00 | 0.00 |
| DY965 | 14.74 | 0.00 | 0.00 | 0.00 | 0.00 |
| PE2 | 0.00 | 3.51 | 3.85 | 3.85 | 0.00 |
| Z6040 | 0.98 | 1.4 | 1.54 | 1.54 | 1.21 |
| I75 | 1.97 | 2.81 | 3.08 | 3.08 | 2.03 |
| TS720 | 1.23 | 1.75 | 1.93 | 1.93 | 1.95 |

Mixing of Part A and Part B

Part A and Part B compositions were mixed together by parts by weight, as represented in Table 4, using a SPEEDMIXER DAC 400 FVZ high-speed shear mixer at 2200 rpm for 30 seconds to one minute until the components mixed thoroughly. The mixture was then used to bond the testing coupons.

TABLE 4

Part A and Part B (parts by weight)

|  | CE1 | CE2 | EX1 | EX2 | EX3 |
|---|---|---|---|---|---|
| Part A | 100 | 100 | 100 | 100 | 100 |
| Part B | 35 | 50 | 50 | 50 | 50 |

Testing

OLS, FRP, and Wedge Impact tests were conducted at specific conditions. The conditions and the results of the testing are represented in Table 5.

TABLE 5

Test Results

|  | OLS MPa (psi) | | FRP N/25 mm | Wedge Impact N/mm |
|---|---|---|---|---|
| Temperature | 23° C. | 82.8° C. | 23° C. | 23° C. |
| CE1 | 32.72 (4745) | 9.39 (1362) | 213.0 | 24.3 |
| CE2 | 26.90 (3902) | 13.01 (1887) | 240.0 | 19 |
| EX1 | 31.49 (4567) | 16.88 (2448) | 210.2 | 31.8 |
| EX2 | 33.12 (4804) | 20.48 (2970) | 187.2 | 24.4 |
| EX3 | 34.74 (5038) | 26.34 (3821) | 191.0 | 16 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of making a curative part of a two-part curable composition, the method comprising:
   combining a dispersion of core-shell rubber particles in an epoxy resin, a heterogeneous dispersant that is a solid thixotropic agent, and a liquid amine to provide a mixture; wherein the core-shell rubber particles have an elastomeric core, a (meth)acrylic shell, and a median particle size of from 20 nanometers to 1000 nanometers; and
   shearing the mixture with a rotary high-shear impeller at temperatures from 25° C. to 90° C. until the core-shell rubber particles are dispersed into the liquid amine, thereby providing a curative part capable of being reacted with a base part comprised of an epoxy resin;
   wherein the liquid amine and the epoxy resin of the dispersion are reacted before or after said shearing to provide a reactive precursor having an increased amine equivalent weight, which increases the viscosity of the curative part and mitigates amine blushing;
   wherein the curative part is phase-stable over a period of at least 3 months at ambient temperature, and
   wherein the curative part comprises from 5% to 30% by weight of the core shell rubber particles, from 0.05% to 20% by weight of the heterogeneous dispersant, and from 10% to 90% by weight of the liquid amine, relative to the overall weight of the curative part.

2. The method of claim 1, wherein the heterogeneous dispersant is present in an amount of from 0.1% to 10% by weight relative to the overall weight of the curative part.

3. The method of claim 1, wherein the heterogeneous dispersant has a primary particle size of from 20 nanometers to 800 nanometers.

4. The method of claim 1, wherein the heterogeneous dispersant comprises one or more of fumed silica, phyllosilicate clay, or polyimide wax.

5. The method of claim 1, wherein the liquid amine is present in an amount of from 45% to 90% by weight relative to the overall weight of the curative part.

6. The method of claim 1, wherein the liquid amine comprises one or more of tetraethylenepentamine, N-aminoethylpiperazine, bis(aminopropyl)piperazine, diethylenetriamine, triethylenetetramine, 4,7,10-trioxatridecane-1,13-diamine, octahydro-4,7-methano-1H-indenedimethylamine, bicyclo[2.2.1]heptanebis (methylamine), meta-xylenediamine, isophoronediamine, and cyclohexanediamine.

7. The method of claim 1, wherein the curative part further comprises a branched polytetrahydrofuran having a secondary amine and/or tertiary amine functionality.

8. The method of claim 1, wherein the rotary high-shear impeller comprises a cowles blade.

9. A curative part of a two-part curable composition made by the method of claim 1.

10. A two-part curable composition comprising the curative part of claim 9 and a base part comprising an epoxy resin.

11. The two-part curable composition of claim 10, wherein the base part further comprises core-shell rubber particles.

* * * * *